United States Patent [19]

Morgan

[11] Patent Number: 5,708,131

[45] Date of Patent: Jan. 13, 1998

[54] AMORPHOUS COPOLYMERS OF TETRAFLUOROETHYLENE AND HEXAFLUOROPROPYLENE

[75] Inventor: Richard Alan Morgan, Vienna, W. Va.

[73] Assignee: E. I. Du Pont de Nemours and Company, Wilmington, Del.

[21] Appl. No.: 639,453

[22] Filed: Apr. 29, 1996

Related U.S. Application Data

[62] Division of Ser. No. 384,042, Feb. 6, 1995, Pat. No. 5,543,217.

[51] Int. Cl.⁶ .................................................. C08F 6/20

[52] U.S. Cl. .......................................................... 528/481

[58] Field of Search ............................................. 528/481

[56] References Cited

U.S. PATENT DOCUMENTS 3,692,759  9/1972  Ocone ...................................... 528/481

*Primary Examiner*—Thomas R. Weber

[57] ABSTRACT

Tetrafluoroethylene polymer resin is isolated from aqueous dispersion by first freezing the dispersion, followed by thawing the dispersion which enables removal of the water and water soluble impurities from the resin particles.

7 Claims, No Drawings

5,708,131

AMORPHOUS COPOLYMERS OF TETRAFLUOROETHYLENE AND HEXAFLUOROPROPYLENE

This is a division of application Ser. No. 08/384,042, filed Feb. 6, 1995 U.S. Pat. No. 5,543,207.

FIELD OF THE INVENTION

This invention is in the field of fluoropolymers, particularly copolymers of tetrafluoroethylene and hexafluoropropylene.

BACKGROUND OF THE INVENTION

Fluoropolymers, including homopolymers and copolymers of tetrafluoroethylene (TFE), collectively TFE polymers, are well known and widely used because of their unusual combination of chemical resistance, surface characteristics, dielectric properties, and high-temperature service capabilities. Depending on chemical composition, i.e., the identity and proportion of monomer units in the polymer, a fluoropolymers may be partially crystalline or amorphous, plastic or elastomeric. Amorphous dipolymers of TFE and perfluorinated alkyl vinyl ethers are known to be elastomeric, with low glass transition temperatures ($T_g$), usually less than 10° C., desirably less than 0° C. More rigid amorphous fluoropolymers, having $T_g$ at about room temperature or higher, are desired.

Certain copolymers of TFE and hexafluoropropylene (HFP) are known. For example, Bro & Sandt in U.S. Pat. No. 2,946,763 disclose TFE/HFP copolymers with HFP content reflected by a specific infrared ratio, herein called HFP index or HFPI, in the range 1.5 to 6. They use a multiplier of 4.5 to convert HFPI to HFP content in wt %. There are frequent references in the literature to TFE/HFP copolymers having HFP content of from 6.75 to 27 wt %, apparently following the disclosure of the 1.5 to 6 HFPI range and 4.5 multiplier by Bro & Sandt. Recent workers in the field have refined their compositional calibrations of HFPI and now generally use multipliers in the range of 3.0–3.2 to convert HFPI to HFP content in wt %.

Morgan in U.S. Pat. No. 5,266,639 discloses partially crystalline TFE/HFP copolymers having HFPI of 6.4 to about 9, made by a semi-batch dispersion polymerization process. Morgan teaches that a high concentration of surfactant can impede isolation of the copolymer resin and that surfactant concentration should be less than 0.4 wt %, preferably less than 0.2 wt %, based on the aqueous medium. Surfactant concentrations exemplified were in the preferred range.

Khan in U.S. Pat. No. 4,381,384 discloses a continuous polymerization process for TFE polymers including copolymers containing up to 20 mol % of a variety of comonomers. For TFE/HFP copolymers, a multiplier of 2.1 was used to convert HFPI to HFP content in mol %, so that the limit of 20 mol % would correspond to an HFPI of 9.5. In the examples for TFE/HFP copolymers, HFP content of 5.4 mol % (HFPI of 2.57) was the highest level actually achieved. The continuous process of Khan in U.S. Pat. No. 4,381,384 suffers from some disavantages, including a very high surfactant concentration that must be used to approach stable reactor operation and to enable discharge of the reaction mass without coagulation of the polymer in or in passing through the let-down valve. This high surfactant concentration can, in turn, make it extremely difficult to isolate the polymer from the dispersion, and can be undesirable in the isolated product. Space-time yield for Khan's low-HFP copolymer was of the order of only 0.1 kg/L-hr.

Khan discloses that TFE/HFP dipolymers having HFP content reflected by HFPI=9.5 are partially crystalline, though HFP incorporation did not approach this level. Morgan discloses that such polymers having HFPI=9 are crystalline, and did not achieve higher levels of HFP incorporation.

Eleuterio in U.S. Pat. No. 3,062,793 describes amorphous copolymers. Such copolymers having HFPI values of about 17 and 22 are exemplified. Eleuterio also discloses a partially crystalline TFE/HFP copolymer having HFPI=10.5 and 15% crystallinity. This level of crystallinity is surprisingly high for the HFPI value, which corresponds to HFP content of about 25 mol % as estimated from examples to follow, especially after melt pressing of the sample. However, Eleuterio's method of synthesis, with all of the TFE and HFP monomers present at the start of the polymerization reaction, would be expected to produce very non-uniform copolymers because HFP is much less reactive than TFE.

Although it is well-established commercial practice to make winter shipments of aqueous dispersions of TFE homopolymers and copolymers in insulated and/or heated trucks to prevent freeze damage, typically irreversible coagulation, no commercial utilization of a freezing process for isolation of TFE polymer resin from its polymerization medium is known. A freeze drying process, involving sublimation of the water from the frozen coagulate or dispersion, for fibrillatible, non-melt fabricable TFE polymer usually supplied as an agglomerate of dispersion particles (often called fine powder) is disclosed by Ocone in U.S. Pat. No. 3,692,759. Furuya & Motoo in U.S. Pat. No. 5,816,431 disclose a process for preparing a dispersion of raw materials for reaction layers of a gas permeable electrode comprising mixing carbon black, polytetrafluoroethylene, water and surfactant, freezing this mixture and then thawing out the mixture.

SUMMARY OF THE INVENTION

The invention provides a uniform amorphous copolymer comprising copolymerized units of tetrafluoroethylene and hexafluoropropylene, having HFP content of up to 29 mol %. In one embodiment of the invention, HFP content is from 20 to 29 mol %. In another embodiment, the copolymer also contains copolymerized units of at least one comonomer selected from fluoroolefin containing 4–8 carbon atoms and fluorovinylether, said copolymer containing sufficient hexafluoropropylene and additional comonomer combined to cause the copolymer to be amorphous, said copolymer having glass transition temperature of at least about 20° C.

The invention also provides aqueous dispersions of said amorphous copolymers, and a process for isolating tetrafluoroethylene polymer resin from aqueous polymerization medium. This process comprises first freezing the dispersion, thawing the frozen dispersion, and then removing the liquid from the polymer solids. In a preferred embodiment of this process, the liquid of the thawed frozen dispersion is removed immediately from the polymer solids, this providing better results than if water removal is delayed. In another preferred embodiment of the isolation process of this invention, thawing of the frozen dispersion, removal of the liquid from the thawed frozen dispersion, and washing of the polymer solids of the thawed frozen dispersion are carried out simultaneously.

The invention further provides a coated article comprising a substrate coated with a coating, wherein the coating comprises amorphous copolymer of tetrafluoroethylene and hexafluoropropylene having HFP content of up to 29 mol %.

DETAILED DESCRIPTION OF THE INVENTION

The TFE/HFP copolymers of this invention have up to 29 mol % of units derived from HFP and are amorphous. By this it is meant that the heat of fusion calculated from any endotherm detected in a differential scanning calorimetry (DSC) scan for as-polymerized resin is no more than about 3 J/g, preferably no more than about 1 J/g. Such endotherms, if actually present, are diffuse, difficult to detect, and calculated heat of fusion at these levels is subject to large relative error. Generally, no endotherm is seen in a second DSC heating even if a weak endotherm is detected for first heating.

The amorphous TFE/HFP copolymers of this invention can contain units derived from one or more additional fluoromonomers selected from fluorolefins having 4 to 8 carbon atoms and fluorovinylethers. Fluoroolefins having 4–8 carbon atoms include compounds such as perfluorobutyl ethylene and perfluoroolefins. Fluorovinylethers include the group of perfluoro(vinyl ethers) having the formula $CF_2=CFO(R'_fO)_\kappa R_f$, wherein $\kappa$ is 0–5, $R'_f$ is linear or I5 branched perfluoroalkylene of 2 to 6 carbon atoms, and $R_f$ is perfluoroalkyl of 1 to 6 carbon atoms, examples of which are perfluoro(alkyl vinyl ether) (PAVE) corresponding to $\kappa=0$. Preferred PAVE include perfluoro(methyl vinyl ether), perfluoro(ethyl vinyl ether) and perfluoro(propyl vinyl ether). Still additional examples of such fluoromonomer includes the functional fluorovinylethers, wherein the functionality is ester, alcohol, or acid. The ester-functional fluorovinylethers can be carboxylic ester or alcoholic ester. Examples of such fluorovinylethers include $CF_2=CF[OCF_2CF(CF_3)]_m-O-(CF_2)_nCH_2OH$ as disclosed in U.S. Pat. No. 4,982,009 and the alcoholic ester $CF_2=CF[OCF_2CF(CF_3)]_m-O-(CF_2)_n-(CH_2)_p-O-COR$ as disclosed in U.S. Pat. No. 5,310,838. Additional fluorovinylethers include $CF_2=CF[OCF_2CF(CF_3)]_mO(CF_2)_nCOOH$ and its carboxylic ester $CF_2=CF[OCF_2CF(CF_3)]_mO(CF_2)_nCOOR$ disclosed in U.S. Pat. No. 4,138,426. In these formulae, m=0–3, n=1–4, p=1–2 and R is methyl or ethyl. Preferred such fluorovinylethers are $CF_2=CFOCF_2CF(CF_3)O(CF_2)_2CH_2Oh$ and $CF_2=CFOCF_2CF(CF_3)O(CF_2)_2COOH$. These fluorovinylethers are preferred either because of their availability or their ability to incorporate functionality into the resultant copolymer. Additional fluorovinylethers include alkyl fluorovinyl ethers such as disclosed in U.S. Pat. No. 3,159,609. The additional comonomer does not prevent the incorporation of the high amount of HFP into the comonomer. Typically from 0.1 to 10 mol % of additional comonomer may be present, based on total monomer units in the resultant copolymer. The uses of amorphous TFE/HFP copolymer disclosed herein include the possibility of the copolymer containing one or more additional comonomers such as described above.

In one embodiment, a TFE/HFP copolymer of this invention that is amorphous as defined above will typically have HFP content of from 20 to 29 mol %, usually from 22 to 29 mol %. (Statements of copolymer composition in terms of comonomer content refer to units derived from said comonomer.) When such copolymer is dipolymer, this is in surprising contrast to Eleuterio's disclosure (U.S. Pat. No. 3,062,793) of a dipolymer having HFPI=10.5 and characterized by substantial crystallinity. This difference is attributed to the copolymers of the instant invention having better uniformity than those of Eleuterio, in the sense of the distribution of TFE and HFP in the copolymer. From the nature of Eleuterio's process, one would expect polymer formed early in the batch to be rich in TFE units (and more crystalline, or more likely to be crystalline), and the supply of TFE monomer in the reaction vessel to be depleted as the polymerization reaction progressed. Consequently, one would expect polymer formed late in the batch to be relatively rich in HFP units, and sequences of two, three, or more HFP units in significant concentration could occur. As shown by Comparative Example B, a TFE/HFP copolymer containing 57 wt % HFP units and made generally by Eleuterio's procedure did in fact contain high concentrations of HFP diads and triads, indicating a lack of uniformity.

In another embodiment, a TFE/HFP copolymer of this invention that is amorphous as defined above also contains copolymerized units of at least one comonomer selected from fluoroolefins containing 4–8 carbon atoms and fluorovinylethers, said copolymer containing sufficient units of HFP and said comonomer combined to cause the copolymer to be amorphous, with HFP and additional comonomer being in such proportions that said copolymer has glass transition temperature of at least about 20° C., preferably at least 25° C., most preferably at least 35° C. This copolymer can also have HFP content of 20–29 mol %, but the presence of additional comonomer enables HFP to be present at less than 20 mol % while still obtaining amorphous copolymer.

The copolymers of this invention usually have melt viscosity (MV) in the range from 1 Pa·s to $10 \times 10^3$ Pa·s. Although a high HFP, or HFP and other comomer, content is the primary requisite for an amorphous TFE/HFP copolymer, it appears that a low MV contributes to low heat of fusion. Thus, resins having lower comonomer content benefit from having a low MV to eliminate traces of crystallinity.

The amorphous TFE/HFP copolymer of this invention is characterized by uniform distribution of HFP units in the copolymer. This means that most of the HFP units present are isolated, i.e., have TFE units as neighbors, and only a minor part of the HFP units are present as diads (sequences of two HFP units) or triads (sequences of three HFP units). The fraction of HFP units in the polymer present as HFP diads and triads combined, determined as described below, is generally less than about 10%, preferably less than about 5%. Triads may not be detectable, indicating a high degree of uniformity for copolymers having high HFP content. The amorphous TFE/HFP copolymer of this invention can be in the form of a dispersion of small resin particles in an aqueous medium. The dispersion particles can be unusually small, with average particle size typically in the range 0.01–0.15 µm, usually 0.02–0.1 µm. Because of the small particle size and the amorphous nature of the copolymer, dispersions can be transparent and very clear.

The polymers of this invention may be made at least by the method known as aqueous dispersion (emulsion) polymerization, and aqueous dispersion polymerization in the presence of a solvent, but with special parameter as will be explained hereinafter.

The minimum HFP partial pressure that can be used to make the amorphous TFE/HFP copolymer of this invention by the present semi-batch process is about 500 psig (3.5 MPa) out of 600 psig (4.2 MPa) total monomer pressure. HFP partial pressure is preferably about 525 psig (3.7 MPa), most preferably about 550 psig (3.9 MPa) out of 600 psig total monomer pressure. Higher, or slightly lower, total monomer pressure may be used, in which case HFP partial pressure should be adjusted proportionately.

The surfactant should be chosen to obtain high dispersion particle surface area (small particle size) in order to enhance reaction rate, which is suppressed by the high concentration of HFP relative to TFE, at desired high levels of HFP incorporation in the copolymer. In the process of this invention, surfactant concentration of at least 1.5× the critical micelle concentration is used to achieve this objective. Preferably, surfactant concentration is 2.0×, more preferably 2.5× the critical micelle concentration. Such concentrations of surfactant have generally been avoided in prior art processes. For purposes of this invention, the critical micelle concentration is defined as the critical micelle concentration as determined at room temperature. The properties of the surfactant-water system under polymerization conditions are uncertain, but advantageous results suggest that micelles may exist.

For discussion of critical micelle concentration, for example, see Kirk-Othmer, Encyclopedia of Chemical Technology, 3rd Ed., Vol. 22, pages 344–346 (1983). As discussed therein, the critical micelle concentration is the concentration at which surfactant molecules form aggregates called micelles. This property is characteristic of each solvent-solute system, and may be determined by measurement of various properties of a solution as a function of surfactant concentration. For this work, the critical micelle concentration was taken as the point on a plot of surface tension vs. concentration in water at which the rate of change of surface tension with increasing concentration became very low. Surface tension was determined using a Prolabo tensiometer, a Wilhemy plate machine. In this technique, a platinum blade is immersed in the liquid, the liquid is withdrawn, and the force on the blade is measured with a torsion wire.

The required surfactant concentration relative to its critical micelle concentration restricts choice of surfactants. For example, the commonly used ammonium perfluorooctanoate (C-8) has a critical micelle concentration of about 0.075 mol/L, and multiples of this value would be unreasonably high. For practical reasons, the surfactant desirably has critical micelle concentration of less than about 0.03 mol/L, preferably no more than about 0.01 mol/L. Suitable surfactants include ammonium perfluorononanoate, which has a critical micelle concentration of about 0.003 mol/L, and the perfluoroalkyl ethane sulfonic acids and salts thereof disclosed in U.S. Pat. No. 4,380,618. Of these, the mixture of $C_6$–$C_{16}$ perfluoroalkyl ethane sulfonic acids sold as Zonyl® TBS fluorochemical surfactant (Du Pont Company), which also has a critical micelle concentration of about 0.003 mol/L, is preferred.

Temperatures in the range of about 95°–115° C., preferably 98°–108° C. are suitable for making the amorphous TFE/HFP copolymers of this invention by the semibatch process used. Surfactants used in emulsion polymerization appear to be less effective at temperatures above 103°–108° C. and there is a tendency to lose dispersion stability.

Initiators commonly employed in emulsion polymerization of TFE copolymers are water-soluble free-radical initiators such as ammonium persulfate (APS), potassium persulfate (KPS), or disuccinic acid peroxide. APS and/or KPS is preferred.

After the reactor is charged with water, surfactant and monomers, heated to the chosen temperature, and agitation is started, a solution of initiator is added at a prescribed rate to initiate polymerization. It is preferred that pressure is allowed to drop as polymerization starts, and that no more TFE is added for a prescribed time, i.e., a dwell period, during which the initiator solution is continuously added. Then, TFE addition is started and controlled according to the scheme chosen to regulate the polymerization. An alternative procedure for this dwell period is to maintain a lower but constant TFE partial pressure during the first part of the batch.

There are several alternatives for regulating the rate of TFE/HFP copolymerization. It is common with most alternatives first to precharge all HFP monomer and then to add TFE to the desired total pressure. Additional TFE is then added after initiator injection and reaction kickoff to maintain the chosen pressure. The TFE may be added at a constant rate, with agitator speed changed as necessary to increase or decrease actual polymerization rate and thus to maintain constant total pressure. Alternatively, the total pressure and the agitator speed may both be held constant, with TFE added as necessary to maintain the constant pressure. A third alternative is to carry out the polymerization in stages with variable agitator speed, but with steadily increasing TFE feed rates. The latter two alternatives provide the most homogeneous product and are preferred.

The HFP monomer is much less reactive than the TFE monomer so that the HFP/TFE ratio must be kept high to assure a high incorporation of HFP. The polymerization kinetics under steady-state conditions also requires a constant ratio of the monomers throughout the polymerization in order to obtain a homogenous copolymer that is consistent throughout the batch, one with randomly distributed monomer units. Failure to do so will result in a broad HFP distribution. Since the TFE is much more reactive than HFP, careful maintenance of a constant HFP/TFE ratio in the aqueous medium is needed.

One or more additional comonomer other than TFE and HFP can be incorporated into the copolymer by either pre-charge, pre-charge plus subsequent addition (pumping), or pumping of the additional comonomer into the reactor, depending on the reactivity of the comonomer and the amount to be incorporated into the copolymer.

While concentrations of surfactant exceeding the critical micelle concentration produce desirable and unexpected results in polymerization, they raise concerns about isolation of the polymer from potentially very stable raw dispersion, i.e., the product of polymerization in the polymerization liquor, and about high residual concentrations of surfactant on the isolated polymer. One aspect of this invention also addresses these problems.

Traditional techniques known in the art (see U.S. Pat. No. 5,266,639, for example) for isolating polymer from the dispersion polymerization medium sometimes achieve incomplete recovery of polymer solids from the medium of this invention. This is probably due to a combination of stabilizing effect of the surfactant in its high concentration and the small particle size characteristic of the product produced by the process. However, it has been discovered that essentially complete recovery of polymer solids from raw dispersion can be achieved by an isolation procedure comprising freezing of the dispersion, subsequent thawing of the frozen dispersion, and then separation of the polymer solids from the thawed frozen dispersion. It has also been discovered that the time between thawing and the removal of the liquid from the polymer solids of the thawed frozen dispersion affects the partitioning of the surfactant between the separated liquid and the recovered solids, with the amount of surfactant carried away by the liquid increasing as the time between thawing and liquid removal decreases. That is, immediate removal of the thawed liquid, or removal of the thawed liquid simultaneously with thawing of the frozen dispersion, causes more surfactant to be removed with the liquid, and less to remain with the polymer solids. The freeze-thaw isolation process is another aspect of the invention. This aspect of the invention is applicable to isolation of fluoropolymer solids from aqueous dispersion polymerization medium from processes producing polymers in addition to the essentially amorphous TFE/HFP copolymers of this invention, and is particularly valuable for non-fibrillatible TFE polymers, including homopolymers and copolymers, produced by a dispersion polymerization process. The freeze-thaw isolation method of this invention can be supplemented with various procedures for washing polymer solids as known in the art. As will be shown by an example below, it is advantageous to thaw, remove the thawed liquid, and wash simultaneously. Simultaneous thawing of the frozen dispersion, removal of the liquid from the thawed frozen dispersion, and washing of the polymer solids of the thawed frozen dispersion is a preferred way of carrying out this part of the isolation process of this invention.

The freeze/thaw process of this invention for isolating fluoropolymer resin dispersion from aqueous medium offers additional advantages over prior art processes. As will be shown by examples to follow, apparent density of dried isolated resin can be high, flow of resin agglomerates can be improved, and surfactant used in polymerization can be more effectively separated from the resin. Preferred modes of carrying out the process enhance separation of surfactant from resin.

In carrying out the freeze/thaw process of this invention, practical considerations will influence the choice of operating details. Perhaps most significant are considerations relating to heat transfer. While the freezing step of the process can be carried out in bulk, as in freezing of a drum filled with dispersion, such a procedure would require a long time. To minimize the time required to freeze a body of dispersion, it is desirable for at least one dimension of the body of dispersion to be frozen, and hence of the body of the resultant frozen dispersion, to be small, e.g., no more than about 3 mm. Thus, for example, the body can be a relatively thin flat film or sheet, or can have a relatively thin-walled cylindrical shape. Bodies of frozen dispersion having at least one small dimension also have the advantage of permitting rapid thawing, for the same heat transfer reasons. Many process designs can provide the advantageous condition of a body of dispersion having at least one small dimension. For example, a thin layer of aqueous dispersion can be placed in a flat tray for freezing, or chilled paddles can be dipped into aqueous dispersion until a layer of frozen dispersion forms on the paddle surfaces, or a chilled roll can be partially immersed in a reservoir of aqueous dispersion with the roll axis parallel to the surface of the dispersion and rotated at such speed to pick up a layer of frozen dispersion to be removed during the part of a revolution of the roll when the frozen dispersion is out of the reservoir, and the like.

The amorphous TFE/HFP copolymers of this invention can be used in many ways. Being amorphous, the resins and fabricated articles thereof are transparent and substantially free from haze, and can be particularly useful in applications for which optical clarity is important. In powder or pellet form, the copolymer resins can be used in any of the processes such as extrusion, molding, or pressing by which thermoplastics are conventionally fabricated into finished articles, providing the properties of the copolymer are suitable for the intended use. Such articles include film, tubing, hose, wire insulation, foamed structures including wire insulation, coatings on wire for mechanical uses, injection-molded items, blow-molded articles, bottles, containers, protective linings, laminates and other composite structures, and the like. The unique thermal characteristics make the amorphous TFE/HFP copolymers of this invention suitable for uses not accessible to prior-art perfluoroplastics because properties were inappropriate or because required processing temperatures were too high. For example, a TFE/HFP copolymer of this invention can be used as a melt adhesive at low temperature. High processing temperatures of prior-art perfluoroplastics disqualified them for use in conjunction with many other materials which could not tolerate exposure to those temperatures.

The amorphous TFE/HFP copolymers of this invention can be used in dispersion form. The as-polymerized (raw) dispersion may be used as discharged from the reactor if it has adequate stability and/or wetting characteristics for the intended purpose. Alternatively, the raw dispersion can be adjusted by addition of surfactants, or concentrated and stabilized by techniques well known in the art. Other materials can be blended into the TFE/HFP copolymer dispersions for use in dispersion form, or such blends can be co-coagulated as a step toward dry blends or filled resins. Small raw dispersion particle size (RDPS) typically obtained contributes to stability with respect to settling and may make the dispersions particularly desirable for certain uses, such as impregnation and the formation of coherent films having small thickness.

The amorphous TFE/HFP copolymers of this invention can be in solution in highly fluorinated solvents. Because of their composition, they are unusually easy to dissolve and can provide stable solutions at ambient temperature. Perfluorinated compounds are preferred as solvents, but fluorinated compounds having up to about 12.5 atomic percent (at %) hydrogen and/or about 37.5 at % chlorine can be used. Compounds most useful as solvents are highly fluorinated cycloalkanes or aromatics, both of which may contain fused or unfused rings. Highly fluorinated cycloalkanes are preferred. Both types of compounds may be substituted by perfluoroalkyl or perfluoroalkylene groups. Compounds useful as solvents include, but are not limited to, perfluorodecalin, perfluoro( 1 -methyldecalin), perfluoro (dimethyldecalin), perfluoro(tetradecahydrophenanthrene), perfluoronaphthalene, perfluoromethylcyclohexane, perfluorobiphenyl, perfluoro(cyclohexylmethyl)decalin, and higher boiling adducts. Certain nitrogen-containing solvents such as perfluoro(triamylamine) may also be used. Preferred solvents are perfluorodecalin and perfluoro (tetradecahydrophenanthrene).

In dispersion form, the TFE/HFP copolymers of this invention can be used according to any of the conventional techniques for using fluoropolymer dispersions, including coating, casting, and impregnation. Normally, after the copolymer dispersion particles are deposited in place in the wet state, the deposit is dried and the particles are fused thermally.

Dispersions and solutions of the amorphous TFE/HFP copolymers of this invention can be used in many ways, making it possible to achieve end results that could not be achieved with previously available perfluoropolymers or could be achieved only in less convenient ways. These results include any of the results for which polymer dispersions and solutions are used, such as coating, encapsulation, and impregnation. The TFE/HFP copolymer dispersions and solutions of the invention can be employed in any of the methods by which such systems are known to be used, including dipping, painting, and spraying. Normally, the dispersion or solution is deposited in place in the wet state, the deposit is dried, and the dried resin is fused or consolidated thermally.

The TFE/HFP copolymer dispersions and solutions of this invention can be used to make coatings on a broad range of substrate materials, including metal, semiconductor, glass, ceramics, refractory materials, dielectric materials, carbon or graphite, and natural and synthetic polymers. The substrates can be in a broad range of physical forms, including film or paper, foil, sheet, slab, coupon, wafer, wire, fiber, filament, cylinder, sphere, and other geometrical shapes, as well as in a virtually unlimited number of irregular shapes. Coatings can be applied by methods known in the art, including dipping, spraying, and painting. For plane substrates of suitable dimensions, spin coating can be employed. Porous substrates, including those made from fluoropolymer such as polytetrafluoroethylene, can also be coated or impregnated. These include, for example, screens, foams, microporous membranes, and woven and non-woven fabrics. In making such coatings, the water or solvent can be driven off by heat leaving a dry TFE/HFP copolymer coating.

Coatings of the amorphous TFE/HFP copolymers of this invention can be a sole coating on a substrate, or a component of a multilayer coating. For example, a TFE/HFP copolymer coating of this invention can be used as a first or primer, intermediate, or final coating in a multilayer fluoropolymer coating system. The coatings of this invention include coatings resulting from several successive applications of dispersion or solution to increase coating thickness to desired levels.

Coatings of this invention can consist of the amorphous TFE/HFP copolymers of this invention alone, or of the TFE/HFP copolymers admixed with minor amounts of other materials either soluble in water or the solvent or dispersed in the coating dispersion or solution. A minor amount can be up to about 10 wt % based on the combined weight of TFE/HFP copolymer and additive.

Specific coated articles are within the scope of this invention.

Coated articles include polymer extrusion dies and molds for rubber and plastic parts, such as o-rings, bottle caps, golf balls, golf ball covers, golf ball cover half shells, and the like. The TFE/HFP copolymers of this invention, both as polymerized and after fluorine treatment, can be used in coatings. In the case of dies used for extrusion of polyolefins, it is preferred that coatings be made from as-polymerized resin because such coatings are more durable. Both interior and exterior surfaces of extrusion dies may be coated to, respectively, facilitate extrusion and alleviate die buildup.

Coated articles include gasoline engine carburetor parts; internal parts of internal combustion engines such as valves and piston skirts; razor blades; metal containers such as cans, pans, trays, vessels, and the like; metal sheets and foils; continuous metal belts; metal rods, tubes, bars, profiles, and the like; bolts, nuts, screws, and other fasteners.

Coated articles include an article bearing a machine-readable marking on at least one surface, especially but not limited to a tag that can be attached to another object to provide information about inventory identification, contents, ownership, hazards, operating conditions, or maintenance requirements, for example.

Coated articles include wire for electrical and mechanical service. In either case, the metal wire may be solid or stranded. Wires for mechanical service include catheter guide wire and the actuating wire of push-pull cable.

Coated articles include rubber o-rings, seals, beading, gasketing, and the like.

Coated articles include paper and textile materials, including woven fabric including glass fabric, non-woven fabric, felts, and the like, fibers including filaments, yarns, e.g. staple and continuous filament, and strands.

Coated articles include foams, membranes, and the like.

Coated articles include optical fibers in which the substrate is a glass or plastic fiber.

Coated articles include optical elements, wherein the coating functions as an anti-reflective coating to reduce or eliminate reflection. Such elements include viewing screens, windows, television screens or faces, computer monitor faces, and the like.

Coated articles include semiconductors, semiconductor devices, magnetic storage media including disks, photoconductors, electronic devices, electronic assemblies, and the like, wherein the coating may be very thin.

A coating of a composition comprising the amorphous TFE/HFP copolymer of this invention can be used as a melt adhesive to bond two articles together. The coating may be applied to a substrate from dispersion or solution, or from thin film of the TFE/HFP copolymer to make a laminate, which is essentially a coated article. Two articles, at least one of which is a coated article comprising a substrate coated with the composition are brought together into conforming contact such that one of the contacting surfaces is the coated substance. These two articles may in fact be a single article with two surfaces that are brought together, and more than two articles may be involved in the bonding, i.e., the bonding method of this invention is not limited to the bonding of two articles. After the two articles are brought together and are in conforming contact with one another, at least the region of this contact is heated above the glass transition temperature of the copolymer, preferably to a temperature of at least 100° C. if the substrate can tolerate such temperature. This heating can be begun prior to the articles being brought together. Pre-heating of the coated article or articles can be advantageous if the coating is applied from a hot solution of a high concentration of copolymer in highly fluorinated solvent to avoid gel formation. With the articles in conforming contact, pressure is supplied to assure intimacy of contact for a time sufficient to effect the bond. This pressure can be an external force or can arise from the weight of the articles. The bonded articles ordinarily will be subsequently cooled to ambient temperature.

The amorphous TFE/HFP copolymers of this invention can be used as processing aids for polymeric resins that are not fluoropolymers, for example, as is well known in the art, as coatings on melt contact surfaces or incorporated in low concentrations into said resins. Typical concentration when used as an incorporated processing aid is in the range 25–5000 ppm. When the TFE/HFP copolymer of this invention is used as a processing aid in a polyolefin for film applications, the polyolefin generally will have a melt index (ASTM D-1238) of 5.0 or less at 190° C., preferably 2.0 or less. For high-shear melt processing such as fiber extrusion or injection molding, even high-melt-index resins, for example, those having a melt index of 20 or more, may suffer processing difficulties. Such polyolefins may comprise any thermoplastic hydrocarbon polymer obtained by the homopolymerization or copolymerization of one or more monoolefins of the formula $CH_2=CHR'$ wherein R' is an alkyl radical, usually of not more than eight carbon atoms. In particular, this invention is applicable to the following: polyethylene, both of the high-density type and the low-density type having densities within the range 0.89–0.97;

polypropylene; polybutene-1; poly(3-methylbutene); poly (4-methylpentene); and linear low density copolymers of ethylene and an alpha-olefin, such as propylene, butene-1, hexene-1, octene-1, decene-1, octadecene-1, or n-methylpentene-1.

EXAMPLES

Fluoropolymer compositions were determined by infrared spectroscopy on 0.025–0.051 mm thick films pressed at 300° C. For TFE/HFP copolymers, Fourier transform infrared spectroscopy was employed in the method described in U.S. Pat. No. 4,380,618. In applying this method, the peak absorbances of bands found at about 10.18 μm and at about 4.25 μm were used, not the absorbances at these exact wavelengths unless they were also the peak absorbances. HFP content is expressed as an index HFPI, the ratio of the two peak absorbances.

Melt viscosities of the fluoropolymers were determined by ASTM method D1238-52T modified as described in U.S. Pat. No. 4,380,618, except that orifices having 0.03 1 inch (0.8 mm) or 0.062 inch (1.6 mm) diameter and weights of 833 g or 2160 g were used for samples having low MV.

Thermal characteristics of fluoropolymer resins were determined by DSC by the method of ASTM D-4591-87. For measurements designed to yield a value for glass transition temperature ($T_g$), samples were cooled to 0° C. before heating was started.

Average size of polymer particles as polymerized, i.e., raw dispersion particle size (RDPS), was measured by photon correlation spectroscopy.

HFP distribution in TFE/HFP copolymer was measured by $^{19}$F NMR using a Bruker AC 250 NMR unit operating at 235 MHz. Polymer samples as 3–5% (wt/vol) solutions in hexafluorobenzene were loaded in 5-mm NMR tubes and heated to 80° C. in a narrow bore probe. Signals due to the tertiary fluorine of HFP units appear at −183.5 ppm for isolated HFP units, at −179.5 ppm for HFP units present as head-to-tail diads, and at −177 ppm for HFP units present as head-to-tail triads. It is uncertain whether or not the integration for the HFP triads at −177 ppm also includes oligomeric blocks larger than triads. The fractions of HFP units present as triads and diads were determined as the ratios, respectively, of the areas of the $^{19}$F NMR signals at −177 and −179.5 ppm to the total of the areas of the signals at −177, −179.5 and −183.5 ppm. The detection limit for triads is less than 1% of HFP units in the copolymer.

In the following, unless otherwise stated, stated solution concentrations are based on combined weight of solvent water and of solute(s). Stated concentrations of polymer solids in dispersions are based on combined weights of solids and aqueous medium, and were determined gravimetrically, i.e., by weighing dispersion, drying, and weighing dried solids, or by an established correlation of dispersion specific gravity with the gravimetric method.

Example 1

A cylindrical, horizontally disposed, water-jacketed, paddle-stirred, stainless steel reactor having a length to diameter ratio of about 1.5 and a water capacity of 79 parts by weight was charged with 52.5 parts of demineralized water. The reactor was heated to 65° C., evacuated, purged with TFE, and then evacuated again. The vacuum in the reactor was then used to draw in a solution of 0.214 part of ZONYL® TBS surfactant in water (1.7 parts). The solution was rinsed into the reactor with another 0.88 part of water. The reactor was then sealed, agitation was begun at 40 rpm, and the reactor temperature was raised to 103° C. After the temperature had become steady at 103° C., HFP was added slowly to the reactor until the pressure was 425 psig (3.0 MPa). Then TFE was added to the reactor to achieve a final pressure of 625 psig (4.4 MPa). Then 0.66 part of a fleshly prepared aqueous initiator solution containing 0.6 wt % of ammonium persulfate (APS) and 0.7 wt % of potassium persulfate (KPS) was pumped into the reactor at 0.055 part/minute. The agitator speed was reduced to 38 rpm and held constant for the remainder of the batch. Thereafter, the same initiator solution was pumped into the reactor at 0.026 part/minute for the remainder of the polymerization. After polymerization had begun as indicated by a 10 psig (0.07 MPa) drop in reactor pressure, additional TFE was added to the reactor to maintain pressure constant at 625 psig until a total of 18.2 parts of TFE had been added to the reactor after kickoff (87 minutes). The TFE feed was then stopped and the reactor was cooled with the initiator feed continuing and the agitator still running. When the temperature of the reactor contents reached 90° C., initiator pumping and agitation were stopped and the reactor was vented. After venting to nearly atmospheric pressure, the reactor was purged with nitrogen to remove residual monomer. The dispersion, which was bluish and translucent, was then discharged from the reactor and saved. Solids content was 31.5 wt % and RDPS was 0.029 μm. Then, 2.0 parts of the dispersion were blended with 1.5 parts of demineralized water and 0.01 part of concentrated nitric acid and coagulated by vigorous stirring. The wet polymer which resulted from the coagulation was compressed to remove a portion of the water and then dried in a circulating air oven at 150° C. The TFE/HFP copolymer resin had an MV of $3.7 \times 10^3$ Pa·s, an HFPI of 4.45, and an apparent density of 400 g/L. Copolymer resin isolated from a separate portion of the dispersion by freezing and thawing had apparent density of 630 g/L, was free-flowing, and was noticably less dusty than the sample isolated by chemical and mechanical coagulation. The polymerization rate, expressed as parts of polymer produced per reactor volume (parts) per hour, was 0.22.

Comparative Example A

A polymerization was carried out similarily to Example 1 except that the initial water charge was 50.2 parts, the surfactant was 0.06 part of ammonium perfluorocaprylate (C-8) and was precharged with the water, the HFP addition was made to a pressure of 450 psig (3.2 MPa) and the agitator speed was turned on at 42 rpm after precharging water and surfactant and then reduced to 40 rpm after the first initiator addition. The product dispersion was milky and opaque, and RDPS was 0.216 μm. Isolation of the resin from the dispersion was carried out identically to the Example 1 dispersion except that only 0.07 part of nitric acid was added. The product resin had an MV of $7.4 \times 10^3$ Pa·s, an HFPI of 4.13, and an apparent density of 360 g/L. Copolymer resin isolated from a separate portion of the dispersion by freezing and thawing had apparent density of 600 g/L, was free-flowing, and was noticably less dusty than the sample isolated by chemical/mechanical coagulation.. The polymerization rate was 0.10 part/part-volume/hour, less than half that of Example 1.

Example 2

A reactor similar to that described in Example 1 but with a water capacity of 8.2 parts by weight was charged with 4.44 parts of demineralized water. The reactor was heated to 65° C., evacuated and purged with TFE, and then left with a partial vacuum. The vacuum in the reactor was then used to draw in a solution of 0.044 part of Surflon® S 111 (ammonium perfluorononanoate, Asahi Glass) dissolved in 0.26 part of demineralized water. The solution was rinsed into the reactor with another 0.088 part of demineralized water. The reactor was then sealed, agitation was begun at 82 rpm and the temperature was raised to 95° C. After the temperature had become steady at 95° C., the reactor was pressurized to 510 psig (3.6 MPa) with HFP. The temperature was then raised to 103° C. The pressure was then 558 psig (3.9 MPa) after the temperature had become steady. The reactor pressure was then increased to 625 psig (4.4 MPa) by the addition of TFE. Then 0.066 part of a freshly prepared aqueous solution containing 2.5 wt % APS was pumped into the reactor at 0.011 part/minute. Thereafter, the same initiator solution was pumped to the reactor at 0.002 part/minute for the remainder of the polymerization. No additional TFE was added for 20 min after pressure up to 625 psig. During that time, the reactor pressure dropped to 594 psig (4.2 MPa) indicating that polymerization had begun. The pressure was then brought back to 625 psig and maintained at that level for the remainder of the polymerization by the addition of TFE. The agitator speed was held constant at 82 rpm. After 1.4 parts of TFE had been added after the initial pressure up (213 min), the TFE feed was stopped and full cooling was applied to the reactor. When the temperature of the reactor contents had dropped to 90° C., the agitator was turned off and the reactor was vented. When the pressure had dropped to 1–2 psig (0.11–0.12 MPa), evacuation and initiator addition were stopped and nitrogen was added to the reactor to give a slow pressure rise. When the pressure reached 5 psig (0.14 MPa), the vacuum port was opened for one minute while maintaining the nitrogen purge. The dispersion, which was water-clear and quite stable, was then discharged from the reactor and saved. Solids content was 29.9 wt % and RDPS was 0.071 µm.

Approximately 800 g of the product dispersion was poured into a plastic bottle and then placed in a freezer at −20° C. for three days. The bottle of dispersion was then thawed out in a bucket of warm water and the polymer phase which had separated was collected on a filter. The filtrate was found to contain 0.56% solids which consisted of polymer, residual surfactant, and initiator salts. The polymer was washed three times with demineralized water and then a portion of that polymer was washed three times with isopropanol (IPA). Both samples were then dried in a 55° C. vacuum oven under reduced pressure with a nitrogen purge for two days. The melt viscosities of both samples were found to be 90 Pa·s, and HFPI was 10.1 for the IPA-washed sample. DSC analysis showed a glass transition at about 45° C. and a broad, weak endotherm at about 88° C., with a heat of fusion of 1.0 J/g. NMR analysis indicated HFP content was 23.3 mol % and that 2.0% of HFP units in the copolymer were in diads. No triads were detected.

Example 3

The polymerization procedure described for Example 2 was followed with the following differences: 1) The initial water charge was 4.63 parts. 2) The surfactant employed was 0.021 part of Zonyl® TBS in 0.166 part of demineralized water. 3) Also added with the surfactant was 0.0033 part of chloroform as a chain-transfer-agent. 4) The pressure in the reactor after HFP addition and raising of the temperature to 103° C. was 552 psig (3.9 MPa). 5) The pressure after TFE addition and that maintained during polymerization was 600 psig (4.2 MPa). 6) Agitation was at 90 rpm. 7) The first initiator addition was 0.066 part of a 2.5 wt % APS aqueous solution pumped at 0.011 part/min. 8) Subsequent initiator addition was the same solution pumped at 0.0022 part/min. And 9) the amount of TFE added after initial pressure up was 0.51 part. The reaction time after resumption of TFE feed was 345 min. The product dispersion contained 14.4 wt % solids and was water clear. RDPS was 0.096 µm. The freeze/thaw isolation procedure described for Example 2 was employed with this dispersion. The TFE/HFP copolymer resin melt viscosity was less than 10 Pa·s and the HFPI was 11.2. DSC analysis showed a glass transition near 45° C., but no indication of a melting endotherm. NMR analysis indicated that HFP content was 27.2 mol % and that 2.4% of HFP units in the copolymer were in diads. No triads were detected.

Comparative Example B

An 85 mL autoclave was loaded with 60 mL of perfluorodimethylcyclobutane and 0.25 g of cobalt trifluoride. The autoclave was sealed, chilled, and evacuated. HFP was used to sweep in 4.25 g of TFE. Enough HFP (about 30 g) was added to bring the pressure of the autoclave to 93 MPa at 23° C. The autoclave was heated to 199° C. and 296 MPa, and additional HFP was added to increase pressure by 6.9 MPa to match Eleuterio's condition of 303 MPa (U.S. Pat. No. 3,062,793). The autoclave was held at about 200° C. for 4 hr and then cooled and vented. The resulting polymer solution was filtered to get rid of pink residues (presumably containing insoluble cobalt compounds), stripped to heavy oil on a rotary evaporator, and then blown down to 0.94 g of solid using a stream of nitrogen. This solid had an inherent viscosity of 0.207 in perfluoro(2-butyl tetrahydrofuran) (Fluorinert® FC-75, 3M Company), closely matching Eleuterio's Example II. NMR analysis showed that the TFE/HFP copolymer contained 57 wt % HFP, and that of total HFP units 46% were present as isolated units, 27% in diads, and 27% in triads.

Example 4

The reactor described in Example 1 was charged with 49 parts of demineralized water and 0.022 part of ammonium perfluorocaprylate (C-8) dissolved in 0.088 part demineralized water. The reactor was pressure tested at 380 psig (2.7 MPa) and 90° C. while agitating at 46 rpm. It was then cooled to reduce the temperature of its contents below 30° C. The reactor was then evacuated and purged three times with TFE monomer, leaving a reduced pressure on the reactor after the final evacuation. A valve was then opened to slowly release ethane into the reactor until the pressure was raised by 20 inches of mercury (0.067 MPa). The valve was then closed and the reactor temperature was raised to 90° C. with the agitator running at 46 rpm. After the temperature reached 90° C., the reactor was pressurized with TFE to a pressure of 380 psig. A freshly prepared aqueous solution (1.82 parts) of 0.25 wt % APS and 1.25 wt % methanol was then pumped to the reactor at 0.20 part/minute. After polymerization began as indicated by a 10 psig (0.07 MPa) drop in reactor pressure, additional TFE was added to the reactor at a rate so as to maintain the pressure at 380 psig. After three parts of TFE had been added to the reactor after kickoff, 2.0 parts of a 2.7 wt % solution of C-8 in demineralized water was pumped into the reactor at a rate of 0.2 part/minute. After 15 parts of TFE addition, 0.66 part of an aqueous solution of APS (0.09 wt %) and methanol (0.45 wt %) was pumped into the reactor at a rate of 0.11 part/minute. When 22 parts of TFE had been added to the reactor, the TFE feed Was stopped but the reaction continued until the reactor pressure dropped to 190 psig (1.4 MPa). The reactor was then vented and the product dispersion was removed. The dispersion contained about 34 wt % PTFE resin particles which had a melt viscosity of $2.6 \times 10^3$ Pa·s as determined by the procedure normally used for TFE copolymers.

One portion of the dispersion was diluted with demineralized water to 23.3 wt % solids, and 1.0 wt % ammonium carbonate (based on weight of polymer) was added. This dispersion was then coagulated by the application of vigorous stirring. The effluent water contained 9 ppm of the C-8 surfactant which had been added to the polymerization.

Separate portions of the dispersion were frozen. Two portions were thawed as described in previous examples, and the thawed frozen dispersions were filtered at different times after thawing. Filtrate collected at 89 hr after thawing contained 237 ppm of C-8, and filtrate collected at 17 hr after thawing contained 325 ppm of C-8. A third portion of frozen dispersion was placed on a filter and the liquid from the thawed frozen dispersion was collected as thawing took place. This filtrate contained 477 ppm of C-8. These results, compared with the result from chemical coagulation above, show that the freeze/thaw isolation technique removes more of the surfactant from the polymer, and that the amount of the surfactant carried away by the liquid increases as the time between thawing and liquid removal decreases.

Another portion of the dispersion was frozen, and the frozen dispersion was broken up into fine particles which were mixed well. Portions of the finely divided frozen dispersion were placed on two different filters at a bed depth of about 0.625 inch (1.6 cm). One portion was thawed as above. The liquid from the thawed frozen dispersion contained 496 ppm of C-8, in close agreement with the first test. After thawing was complete, the PTFE resin was washed three times with warm water (40°–45° C.), dried for three days at 55° C. in a vacuum oven, and analyzed for C-8 residue. C-8 residue was 782 ppm based on the weight of PTFE resin. The second portion was thawed and washed simultaneously, with three warm water washings. The PTFE resin so obtained was dried as above and was analyzed to have only 376 ppm of C-8 residue, showing the benefit of simultaneous thawing, washing and removal of liquid from thawed frozen dispersion.

Example 5

An aqueous dispersion of an amorphous TFE/HFP copolymer was produced by a method similar to that described in Example 3, except that half as much chloroform was used. HFPI of isolated resin was 10.8, MV was 18 Pa·s, and no melting endotherm was found by DSC. The raw dispersion was water clear, contained 15 wt % solids, had RDPS of 0.03 μm, and surface tension of 69.2 dyne/cm as measured by the ring method using a du Nouy Tensiometer. The raw dispersion would not wet glass and a variety of metal surfaces.

The surface tension of the raw dispersion was reduced to 24.2 dyne/cm by adding I 0 g of Zonyl® FSN fluorosurfactant (DuPont Company) to 90 g of dispersion. Zonyl® FSN is a 40 wt % solution of a nonionic surfactant in isopropanol. The lower surface tension allowed the dispersion to wet glass and various metal substrates readily.

Three diluted dispersions were prepared from the original raw dispersion, as shown in the following table:

|  | A | B | C |
|---|---|---|---|
| Raw dispersion (g) | 5 | 10 | 20 |
| Water (g) | 95 | 90 | 80 |
| Zonyl ® FSN (g) | 0.5 | 1 | 2 |
| Solids content (wt %) | 0.75 | 1.5 | 3 |

Example 6

This example illustrates the film forming capability and the adhesion to glass and metal substrates of the amorphous TFE/HFP copolymer of this invention. Dispersions A, B & C prepared in Example 6 were used to coat glass and various metal coupons. Coupons of size 1×3×0.025 inch (25×76×0.6 mm) were cleaned with acetone in an ultrasonic bath, dried at 150° C. for 4 hr, cooled to room temperature, and dipped into the dispersions. Excess dispersion was drained off, and the coupons were dried overnight at 150° C. Metals tested were copper, brass, aluminum, stainless steel, galvanized steel, and chrome plated steel.

All coatings were smooth and clear. Coating adhesion to substrate was tested according to ASTM D-3359. Each coating was scored (scratched) in a 10-line cross-hatch pattern of 10 lines/inch (line separation 2.5 mm) using a razor knife edge. Adhesive tape was pressed against the scored coatings. The tape was removed and the coatings were examined. No removal of copolymer film from the coupons occurred. The coupons with scored coatings were placed in boiling water for 1 hr, then were removed from the water, dried at 150° C. for 1 hr, and cooled to room temperature. Adhesive tape was again pressed against the scored coatings and then removed. No removal of copolymer film from the coupons occurred. Thus, the coatings were strongly adhered to the glass and metal coupons and resisted the action of boiling water.

Example 7

This example illustrates the adhesion of amorphous TFE/HFP copolymer coatings to polymeric substrates. Polymer strips of size 1×3×0.075 inch (25×76×1.9 mm) were prepared from polymethylmethacrylate, polycarbonate, nylon 6,6, EPDM hydrocarbon rubber vulcanizate, polychloroprene rubber vulcanizate, and hydrogen-containing fluoroelastomer vulcanizate, and strips of size 1×3×0.01 inch (25×76×0.25 mm) were cut from films of polyethylene, polyethylene terephthalate, and polyimide. All samples were cleaned with acetone in an ultrasonic bath, dried at 70° C. for 4 hr, cooled to room temperature, and dipped into dispersions A, B & C prepared in Example 6. Excess dispersion was drained off, and the strips were dried overnight at 70° C. All coatings were smooth and clear.

Coating adhesion to substrate was tested according to ASTM D-3359. Each coating was scored (scratched) as in Example 7. Adhesive tape was pressed against the scored coatings. The tape was removed and the coatings were examined. No removal of TFE/HFP copolymer film from the strips occurred. The strips with scored coatings were placed in boiling water for 1 hr, then were removed from the water, dried at 70° C. for 1 hr, and cooled to room temperature. Adhesive tape was again pressed against the scored coatings and then removed. No removal of polymer film from the strips occurred. Thus, the coatings were strongly adhered to the polymer strips and resisted the action of boiling water.

Example 8

This example illustrates utility of the amorphous TFE/HFP copolymer of this invention as a processing aid. The inside surface of a 0.015×0.375 inch (0.4×9.5 mm, inside diameter x length) tungsten carbide capillary die having a 90° entrance angle was coated with dispersion C prepared in Example 6. The coating was dried at 220° C. for 2 hr. A linear low density polyethylene resin having melt index of 1 g/10 min (GRSN 7047, Union Carbide) and containing 2.5 wt % of colloidal silica to act as an abrasive was extruded through the coated capillary die, and through a control capillary die that had not been coated, using an Instron Capillary Rheometer at a temperature of 220° C. and at a shear rate of 833 sec$^{-1}$. When the polyethylene was extruded through the control capillary, the shear stress required was 4.5×10$^5$ Pa and the surface of the extrudate was rough and distorted due to melt fracture. When the polyethylene was extruded through the coated capillary under the same conditions, the shear stress required dropped to 2.5'10$^5$ Pa shortly after start up and the surface of the extrudate was smooth and undistorted. The shear stress slowly rose, over a period of about one hour, to 4.5×10$^5$ Pa as the copolymer coating was slowly worn away. When the shear stress reached a level greater than 3×10$^5$ Pa, the surface of the extrudate again became rough. This shows that the amorphous TFE/HFP copolymer coating acted as an extrusion aid that significantly reduced shear stress and eliminated surface roughness. Addition of a low concentration of the copolymer resin to the polyethylene resin would have permitted sustained extrusion without melt fracture at reduced shear stress.

I claim:

1. A process for isolating non-fibrillatible tetrafluoroethylene copolymer resin from aqueous dispersion produced by dispersion polymerization, comprising first freezing said dispersion to form frozen dispersion, then thawing said frozen dispersion to form thawed frozen dispersion, and then separating said resin from liquid of said thawed frozen dispersion.

2. The process of claim 1, wherein said liquid is removed from said polymer resin immediately after said frozen dispersion becomes said thawed frozen dispersion.

3. The process of claim 1, wherein said liquid is removed simultaneously with said thawing and with washing of said resin.

4. The process of claim 1, wherein said freezing is done by rotating a chilled roll in said dispersion to form a layer of said frozen dispersion on the surface of said roll, and wherein said layer is scraped from said surface of said roll before said surface re-enters said dispersion.

5. A process for isolating non-fibrillatible tetrafluoroethylene copolymer resin from aqueous dispersion produced by dispersion polymerization, consisting essentially of first freezing said dispersion to form frozen dispersion, then thawing said frozen dispersion, and separating said resin from liquid of the resultant thawed frozen dispersion.

6. The process of claim 5 and washing said resin from said resultant thawed frozen dispersion.

7. The process of claim 6 wherein said thawing and separating are carried out simultaneously and said washing is carried out simultaneously with said thawing and separating.

* * * * *